United States Patent [19]

Blackwell et al.

[11] Patent Number: 5,751,974
[45] Date of Patent: May 12, 1998

[54] CONTENTION RESOLUTION FOR A SHARED ACCESS BUS

[75] Inventors: Steven R. Blackwell, Huntsville; Charles E. Polk, Athens; Jason N. Morgan, Madison, all of Ala.

[73] Assignee: Motorola, Inc., Schaumburg, Ill.

[21] Appl. No.: 827,123

[22] Filed: Mar. 27, 1997

Related U.S. Application Data

[63] Continuation of Ser. No. 278,293, Jul. 21, 1994, abandoned.

[51] Int. Cl.$^6$ .................................................. H04J 6/00
[52] U.S. Cl. ............................................. 395/301; 370/416
[58] Field of Search ................................ 395/293–305, 395/728–732; 370/414, 416, 418

[56] References Cited

U.S. PATENT DOCUMENTS

| | | | |
|---|---|---|---|
| 4,063,220 | 12/1977 | Metcalfe et al. | 340/147 |
| 4,332,027 | 5/1982 | Malcolm et al. | 370/85.3 |
| 4,476,467 | 10/1984 | Terwilliger et al. | 340/825.5 |
| 4,519,074 | 5/1985 | Basile | 370/124 |
| 4,560,985 | 12/1985 | Strecker et al. | 370/85.3 |
| 4,656,627 | 4/1987 | Hasley et al. | 370/85 |
| 4,755,990 | 7/1988 | Bohler et al. | 370/85 |
| 5,297,260 | 3/1994 | Kametani | 395/325 |
| 5,377,189 | 12/1994 | Clark | 370/85.9 |
| 5,383,185 | 1/1995 | Armbruster et al. | 370/85.3 |
| 5,416,910 | 5/1995 | Moyer et al. | 355/325 |
| 5,436,903 | 7/1995 | Yang et al. | 370/85.3 |
| 5,454,111 | 9/1995 | Frame et al. | 395/288 |
| 5,459,840 | 10/1995 | Isfeld et al. | 395/309 |

OTHER PUBLICATIONS

"Filtering of Network Addresses in Real Time by Sequential Decoding" P. Wolstenholme, Jan. 1988 pp.55–59 IEEE Proceedings vol. 135.

*Primary Examiner*—Ayaz R. Sheikh
*Assistant Examiner*—Paul R. Myers
*Attorney, Agent, or Firm*—J. Ray Wood; John W. Powell

[57] ABSTRACT

Data communication stations 10, 12, 14 are connected by way of a shared bus 15 common to all the communication stations. When two stations attempt to access the shared bus simultaneously, a conflict resolution method if used to determine which of the two stations is allowed access to the bus 15. Each station seeking access to the bus 15 serially transmits its address. The priority of the stations is determined, and the station with priority is given access to the bus 15.

7 Claims, 2 Drawing Sheets

CONTENTION RESOLUTION FOR A SHARED ACCESS BUS

This is a continuation of application Ser. No. 08/278,293, filed Jul. 21 1994 now abandoned.

TECHNICAL FIELD

This application relates to the field of data communication.

BACKGROUND OF THE INVENTION

In a peer-to-peer communication system, data communication equipment (DCE) are connected by way of a shared bus. A shared bus is common to all the communication devices. When a device desires to send data to another device on the shared bus, the device must wait until the shared bus is available.

It is possible that two devices will attempt to send data on the bus at the same time. An attempt to send data simultaneously is a "contention". When data from two devices is in fact sent simultaneously, then a "collision" occurs. When that happens, the contention must be resolved.

One method of resolving the contention is the Carrier Sense Multiple Access with Collision Detection protocol, defined in the Institute of Electrical Engineers Standard (IEEE Std) 802.3. The IEEE Std. 802.3 facilitates common network access through transmission requirements, collision detection and a collision resolution procedure.

The IEEE Std. 802.3 requires that calls for devices with colliding transmission packets to wait for a random period of time. After the wait, the two devices begin transmitting again.

This method of collision avoidance has at least three problems. First, there is a possibility of recurring collisions, since no device is inhibited from transmitting during a collision. Second, since messages may be stopped in the middle of transmission, the messages may be corrupted. Third, there may be a delay in transmitting messages if a number of collisions occur.

A method of doing contention resolution eliminating recurring collisions and data corruption is thus highly desirable.

DESCRIPTION OF THE PREFERRED EMBODIMENT

Figure 1:
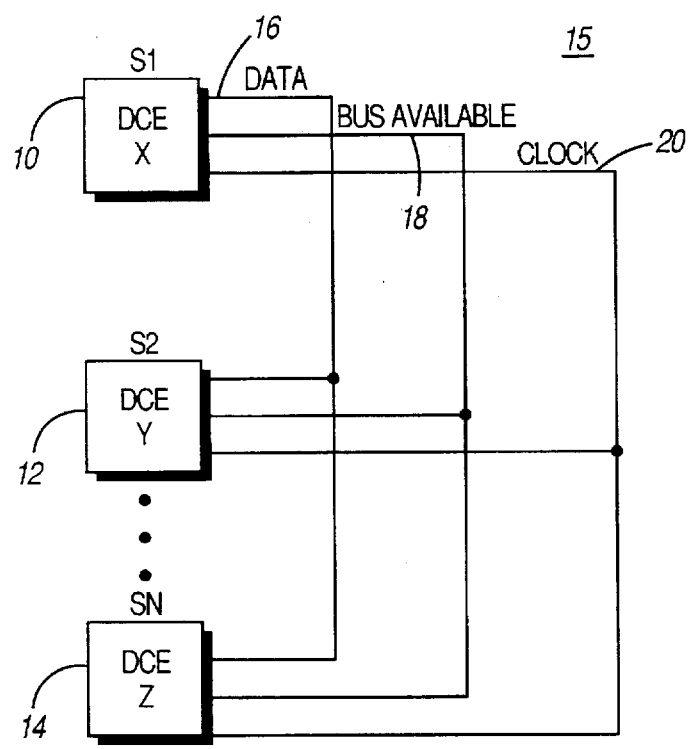
FIG. 1 is a diagram of a communication system.

FIG. 1 shows an arrangement of a plurality of stations 10, 12, 14 (named DCE $S_1$, DCE $S_2$ and DCE $S_n$, respectively) coupled to a bus 15. Stations 10, 12, 14 could be, for example, analog modems, digital modems or an ISDN (integrated digital network) terminal adapter. Bus 15 has a data line 16, a bus available line 18, and a clock line 20. Stations 10, 12, 14 are connected to each line of the bus 15.

Data line 16 carries messages (i.e., DATA) between the stations 10, 12, 14. The data line 16 may act as an address line. A separate address line could be provided. Bus available line 18 carries a BUS AVAILABLE signal indicating whether a station 10, 12, 14 may transmit a message. Clock line 20 carries a CLOCK signal which provides a timing reference by which stations 10, 12, 14 read and write signals to data line 16.

Both the data line 16 and the bus available line 18 have an "active" state and an "idle" state. If any stations holds the signal in the active state, the line is active. The line is idle if no device holds the line active. Typically, the active state is a "0" and the idle state is "1". Obviously, the implementation of these states could be reversed.

For the bus available line 18, the active state is the "false" state. Thus if any device holds the bus available "active", then the bus available line 18 will be false.

Figure 2:
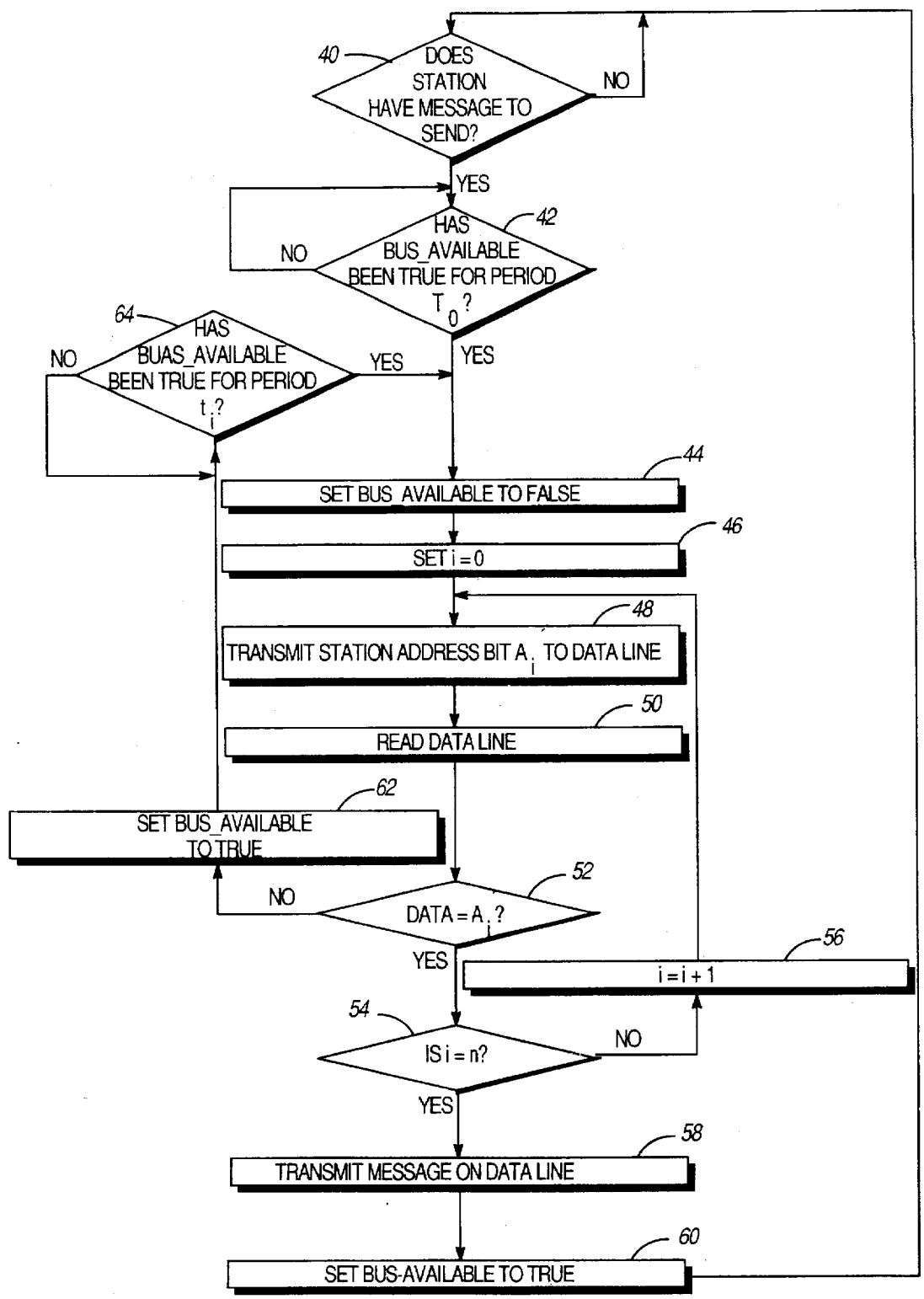
FIG. 2 is a flow chart showing the operation of a communication system.

The procedure by which the stations transmit messages is shown in FIG. 2.

When a station 10, 12, 14 desires to transmit a message (40), the station accesses the bus available line 18 (42). If the BUS AVAILABLE signal is false, then the station waits and continues to test the bus available line 18.

If the BUS AVAILABLE signal is TRUE, indicating an idle condition for a predetermined time period $t_0$, the station then transmits its address to the data line of the bus one bit at a time. ("Idle" means that the bus is inactive. If the bus is busy, the bus is considered "active".) The bus available line 18 is set to FALSE to indicate that the bus is busy (44). A counter i is set to zero (46). The first bit of the address is $A_0$, and successive bits are $A_i$.

The address bit $A_i$ is sent to the data line 16 (48). The station then reads a number from the data line 16 (50) and compares it to $A_i$ (52).

If the data line 16 does equal $A_i$, then no collision is indicated. The station then compares i to n (54), where n is the total number of bits of the address of the station. If i is not equal to n, then i is incremented by 1 (56), and the next address bit of the station address is sent to the data line, and the process is repeated. The process is repeated until i equals n. When i equals n, the entire address has been sent to the data line 16 with no indication of a collision. Therefore, the station has sole transmission access to the bus 15 and transmits the message on data line 16. When the message has been sent, the bus available line 18 is set to TRUE.

If the data line 16 does not equal $A_i$, then a collision is indicated. That is, two or more stations are trying to send a message at the same time. Further, since the data line does not equal $A_i$, another station sending a message has priority.

The station then releases the bus 15 by setting the bus available line 18 to TRUE (62). The station then waits until the bus 15 has been idle (i.e., BUS AVAILABLE=TRUE) for a predetermined time $t_1$, where $t_1$ is less than predetermined time $t_0$ (64) before attempting to send the message again (44).

The predetermined times $t_0$ and $t_1$ may consist of waiting for a predetermined number of clock cycles, $m_0$ and $m_1$, respectively. Thus, $m_0$ would be greater than $m_1$. For example, $t_0$ could be 1 clock cycle while $t_1$ could be 2 clock cycles.

The process thus described provides a simplified method for collision detection and collision resolution. If two stations attempt to send messages simultaneously, one of the stations will succeed unimpeded, thus resulting in less delay. Data is not lost, and there is no problem with establishing synchronicity between the station sending the message and the station receiving the message.

A station that did not succeed in sending the message due to a collision detection has a shorter wait time than a station that has not encountered a collision. Thus, the messages are sent in the order in which they were generated.

Further, priority between stations can be easily managed. If the system is configured such that a "1" has priority on the data line 16 (that is, if a "1" and a "0" are sent simultaneously, the data line 16 becomes "1"), then a station with the highest priority can have its address set to "111" while a station with the lowest priority can have its address set to "000".

We claim:

1. In an arrangement of a plurality of stations coupled to a data bus and having access to one or more address lines, each station having a unique station address, a method of resolving contention for access to the data bus between two or more stations desiring access to the data bus, the method comprising:

transmitting on the address line(s) the station addresses of the stations desiring access to the data bus;

reading the address on the address line(s);

comparing the address on the address line(s) with the station addresses of the stations desiring access to the data bus; and enabling the station with the station address that matches the address on the address line(s) to access the data bus.

2. The method of claim 1 further including waiting until the data bus is inactive for a first predetermined time period prior to the step of transmitting.

3. The method of claim 1 wherein each station address consists of a plurality of address bits and the step of transmitting the station addresses includes transmitting the address bits serially, one bit at a time on the address line(s).

4. The method of claim 3 wherein the step of comparing includes:

serially comparing each bit of the address on the address line(s) with each corresponding bit of each station address of the stations desiring access to the data bus; and terminating transmission of the station address of any station when an address bit on the address line(s) does not match the corresponding bit of the station address.

5. The method of claim 1 wherein the step of enabling includes transmitting data from the station having the station address which matches the address on the address line(s) to one of the other stations.

6. The method of claim 2 further including waiting until the bus is inactive for a second predetermined time period, less than the first predetermined time period, after the station having the station address which matches the address on the address lines has accessed the bus before the station(s) denied access to the bus again attempts to access the bus.

7. In an arrangement of a plurality of stations coupled to a data bus and having access to one or more address lines, each station having a unique station address, a method of providing a station access to the data bus, comprising:

(a) waiting until the data bus is inactive for a first predetermined time period;

(b) transmitting on the address line(s) the station address of the station desiring access to the data bus;

(c) reading the address on the address line(s);

(d) comparing the address on the address line(s) with the station address of the station desiring access to the data bus;

(e) enabling the station to access the data bus when the station address matches the address on the address line(s);

(f) when the station address does not match the address on the address line(s), waiting until the data bus is inactive for a second predetermined time period, less than the first predetermined time period; and (g) repeating steps (b) through (g) until the data bus is accessed.

* * * * *